United States Patent
Love et al.

[19]

[11] Patent Number: 6,115,031
[45] Date of Patent: Sep. 5, 2000

[54] METHOD OF CONVERTING COLOR VALUES

[75] Inventors: Shaun Timothy Love; Stuart Willard Daniel; Steven Frank Weed, all of Lexington, Ky.

[73] Assignee: Lexmark International, Inc., Lexington, Ky.

[21] Appl. No.: 09/298,741

[22] Filed: Apr. 23, 1999

[51] Int. Cl.[7] .................................................. G09G 5/06
[52] U.S. Cl. .......................... 345/199; 345/154; 358/1.2; 358/1.9; 358/523
[58] Field of Search ..................................... 345/199, 431, 345/153, 154; 358/1.2, 1.9, 518, 523, 530, 534, 443, 444, 448, 455, 456

[56] References Cited

U.S. PATENT DOCUMENTS

| | | | |
|---|---|---|---|
| 4,297,744 | 10/1981 | Hoffmann et al. | 708/103 |
| 4,394,693 | 7/1983 | Shirley | 358/298 |
| 5,062,724 | 11/1991 | Iizuka | 400/121 |
| 5,377,041 | 12/1994 | Spaulding et al. | 358/518 |
| 5,548,689 | 8/1996 | Poppenga et al. | 358/1.9 |
| 5,548,690 | 8/1996 | Shimada | 358/1.2 |
| 5,553,201 | 9/1996 | Muramatsu | 358/1.9 |
| 5,559,930 | 9/1996 | Cariffe et al. | 358/1.2 |
| 5,574,832 | 11/1996 | Towery et al. | 358/1.9 |
| 5,644,648 | 7/1997 | Bose et al. | 382/177 |
| 5,689,624 | 11/1997 | Allegrezza | 358/1.1 |
| 5,729,358 | 3/1998 | Uchiyama et al. | 358/451 |
| 5,745,659 | 4/1998 | Rigau Rigau et al. | 358/1.2 |
| 5,745,660 | 4/1998 | Kolpatzik et al. | 358/1.8 |
| 5,748,860 | 5/1998 | Shively | 395/114 |
| 5,787,193 | 7/1998 | Balasubramanian | 382/167 |
| 6,042,211 | 3/2000 | Hudson et al. | 347/15 |

*Primary Examiner*—Kee M. Tung
*Attorney, Agent, or Firm*—Todd T. Taylor; D. Brent Lambert

[57] ABSTRACT

A method of converting a first set of input color values, such as RGB color values, into a set of device colorants, such as CMY color values, includes the step of providing a look-up table associating a respective, predetermined set of CMY color values with each of a plurality of selected sets of RGB color values. The first set of RGB color values includes a first red color value, a first green color value and a first blue color value. A first random number is added to the first red color value to obtain a randomized red color value. A second random number is added to the first green color value to obtain a randomized green color value. A third random number is added to the first blue color value to obtain a randomized blue color value. Each of the randomized red color value, the randomized green color value and the randomized blue color value are compiled together to obtain a set of randomized RGB color values. A closest one of the selected sets of RGB color values in the look-up table is determined which is closest to the set of randomized RGB color values. The first set of RGB color values is converted into a set of CMY color values that is associated with the closest one of the selected sets of RGB color values in the look-up table. The random numbers which are added to the original RGB values are derived through a deterministic process based on the low order bits of those values.

16 Claims, 2 Drawing Sheets

| 213 | 94 | 156 | 42 |
| --- | --- | --- | --- |
| 11 | 233 | 103 | 196 |
| 175 | 86 | 127 | 66 |
| 148 | 39 | 244 | 180 |

THRESHOLD MATRIX

METHOD OF CONVERTING COLOR VALUES

BACKGROUND OF THE INVENTION

1. Field of the Invention.

The present invention relates to a method of converting color values, and, more particularly, to a method of converting color values using a color lookup table as may be used in a fax machine, copier or printer.

2. Description of the Related Art.

A color image is often formed by an array of pixels or dots, with each pixel or dot having multiple color components. In image data produced by an input device such as a scanner, for example, each pixel typically has three color components such as red, green and blue (RGB). Each pixel has three color values ranging between 0 and 255, with each of the color values corresponding to a respective one of the three color components. Although human vision can detect only approximately 100 differences in each axis of three dimensional color perception, more than twice that many levels are required in device colorant values to avoid Mach bands because of nonlinearity between device colorant space and human color perception.

Each dot produced by a printer can also be formed by a combination of three or more color components. However, the printer's color components are often cyan, magenta and yellow (CMY) or cyan, magenta, yellow and black (CMYK), instead of red, green and blue. When printing the image with a printer, it is necessary to convert, for each pixel, each of the input color values into respective output color values in order to accurately reproduce the image color on the print medium.

One known method of converting input color values into output color values is to use a look-up table. In the look-up table, a corresponding set of output equivalent color values is provided for each set of input color values in the look-up table. Due to memory constraints, it is not practical for each of the over sixteen million possible combinations of input color values to be listed in the look-up table. Rather, a "sparse" look-up table is created which includes regularly spaced or intermittent combinations of input color values. For example, if the look-up table includes only combinations of input color values in which each color value is a multiple of eight, the over 16 million possible combinations is reduced to just over 32 thousand possible combinations.

Each component of the input color value, for example, red, green or blue, can be visualized as corresponding to a respective axis in three dimensional space, as shown in FIG. 1. Each axis ranges between 0 and 255. The sparse look-up table can be visualized as a plurality of evenly spaced points within this three dimensional space. Thus, a great majority of the input color values in an image will map into a point within this three dimensional space which does not correspond to one of the entries in the look-up table. Rather, the point will be surrounded by eight points from the look-up table which collectively define a cube in the three dimensional space. Eight points defining such a cube are shown in FIG. 1., with the cube surrounding a point P corresponding to the input color values of a pixel in the image.

The traditional method of assigning output color values to a set of input color values represented by point P is to interpolate between the known output color values of the surrounding eight input look-up table entries. More particularly, trilinear interpolation is performed between the output color values that correspond to each of the eight input color values that define the surrounding cube. However, such trilinear interpolation is very computationally intensive.

On a variety of output devices including many printers, the above color values are not displayed directly. This is because a printer is incapable of displaying as broad a range of color values as the pixels contain. Rather, a printer may only be capable of bi-level output. In such bi-level output, at a certain point on the print medium, a dot of at least one of the color components is either printed, or it is not. A process referred to as "halftoning" is used to convey the color values of the visual image to the print medium with a bi-level output. In halftoning, a dot of a given output color is placed at a given point on the print medium only if the corresponding output color value of the corresponding pixel exceeds a threshold value. Thus, the higher the color values in a certain area of the image, the more dots that are printed on the print medium. The human eye tends to average the printed dots and white spaces together as a shade of a color. Moreover, the various ratios of dots to blank spaces in different areas of the printed display are perceived as being different shades of color, corresponding to the color values of the image.

Bi-level printing based upon a comparison of the color values of each pixel to the same constant threshold value would result in undesirable artifacts in the printed image, however. These artifacts may include abrupt color transitions in areas where color values to one side of a line are below the threshold value, and color values to the other side the line are above the threshold value. To eliminate such artifacts, halftoning can be performed using threshold arrays, error diffusion or other methods, such methods being well known to those skilled in the art. If a threshold array is employed, the single threshold value is replaced by a matrix of various threshold values, a fragmentary portion of which is shown in FIG. 3. Since color values typically have 256 levels ranging between 0 and 255 as discussed above, the threshold matrix can be a sixteen row by sixteen column arrangement of cells, with each cell containing a threshold value ranging between 0 and 255. For ease of illustration, however, only a four cell by four cell fragmentary portion of such a threshold matrix is shown in FIG. 3. In a process called "masking", the threshold matrix can be thought of as being superimposed over the image to be printed, with each cell of the threshold matrix corresponding to a pixel in the image. In order to determine whether to print a dot, the color values of each pixel of the image are compared to the threshold value within the corresponding cell of the threshold matrix. In essence, the color values of the pixel are probabilities indicating the likelihood that a dot will be printed at the corresponding point on the print medium. The threshold matrix is then applied to an adjacent block of pixels, and the process continues until all of the pixels of the image have been masked. Separate dithering can be used for each color component of the image as rendered by the device, such as cyan, magenta and yellow.

SUMMARY OF THE INVENTION

The present invention provides a method of converting a set of input color values into a set of output color values, with a minimum of computational time.

The invention comprises, in one form thereof, a method of converting a first set of input color values such as RGB color values into a set of output color values such as CMY color values. The method includes the step of providing a look-up table associating a respective, predetermined set of CMY color values with each of a plurality of selected sets of RGB color values. The first set of RGB color values includes a first red color value, a first green color value and a first blue color value. A first random number is added to the first red color value to obtain a randomized red color value. A second random number is added to the first green color value to obtain a randomized green color value. A third random number is added to the first blue color value to obtain a randomized blue color value. Each of the randomized red color value, the randomized green color value and the randomized blue color value are compiled together to obtain a set of randomized RGB color values. A closest one of the selected sets of RGB color values in the look-up table is determined which is closest to the set of randomized RGB color values. The first set of RGB color values is converted into a set of CMY color values that is associated with the closest one of the selected sets of RGB color values in the look-up table.

An advantage of the present invention is that the computational time required to interpolate between CMY color values in an RGB to CMY conversion look-up table is avoided.

Another advantage is that abrupt color transitions between blocks of uniform color in the CMY based display are eliminated.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
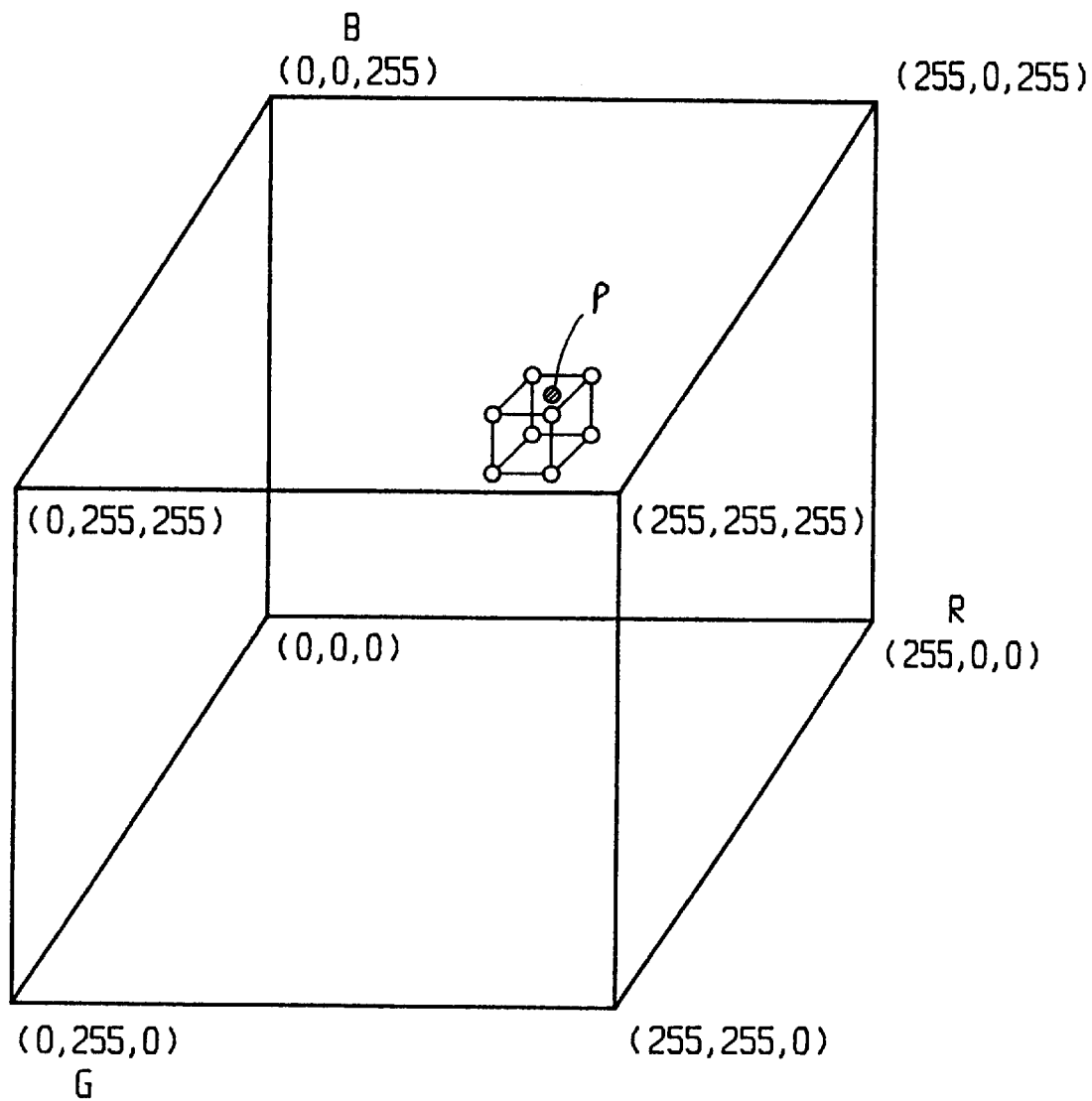
FIG. 1 is a schematic view of eight RGB color value entries of a look-up table, with the eight entries defining a unit cube containing a point associated with the RGB color values of a pixel to be converted to CMY color values.

Referring now to FIG. 1, there are shown eight RGB color value entries of a look-up table, with the eight entries defining a unit cube in three dimensional space. Since the cube is composed of adjacent entries in the sparse lookup table, it is herein referred to as a "unit cube". Such a unit cube contains a point P associated with the RGB color values of a pixel to be converted to CMY color values. Each of the eight selected sets of RGB color values defines a respective corner of a unit cube. Each pixel in an RGB color image corresponds to a respective point in the RGB three dimensional space, with the respective point being surrounded by a cube defined by eight RGB color value entries of the look-up table.

Figures 2, 3:
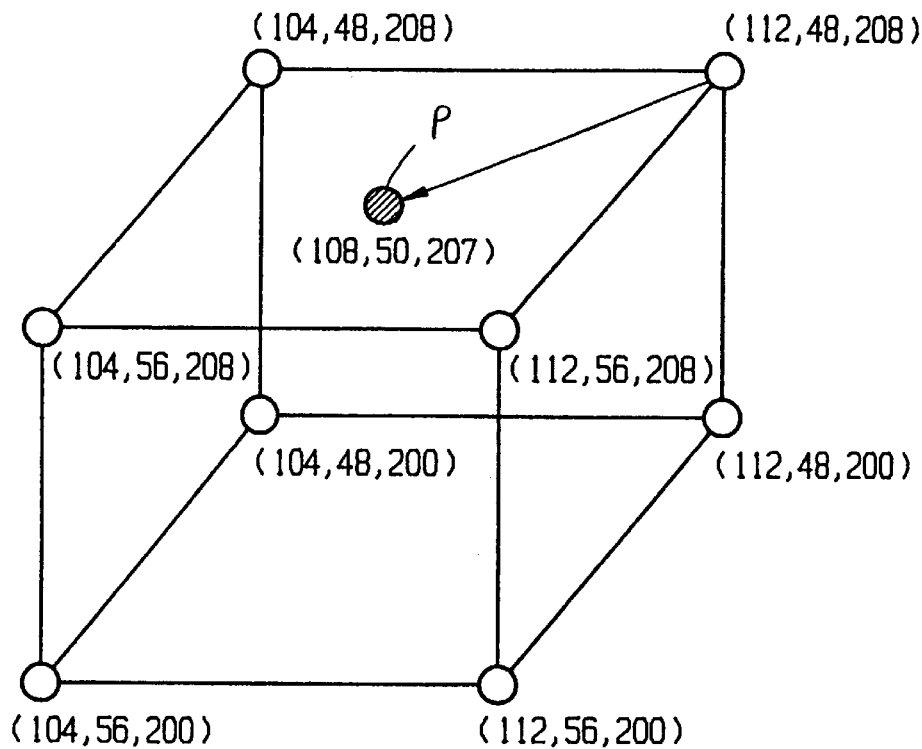
FIG. 2 is an enlarged view of the unit cube and associated point of FIG. 1, including the associated RGB color values.
FIG. 3 is a fragmentary view of a threshold matrix used in one embodiment of the present invention.

FIG. 2 is an enlarged view of the unit cube and associated point of FIG. 1. Shown are the RGB color values associated with each of the eight corners of the unit cube, as well as the RGB color values associated with the point corresponding to the pixel to be converted in CMY color values.

Assuming that the point corresponding to the pixel is to be assigned CMY color values by the above-described known process of trilinear interpolation, two key observations are made. First, the average of the interpolated CMY color values of a cluster of adjacent image pixels will be approximately equal to the average of the CMY color values associated with the eight corners of each of the unit cubes surrounding the RGB points corresponding to the cluster of pixels. Second, on a printer, or any other device which uses halftoning, the CMY color values of the interpolated pixels are not directly displayed. Rather, one or more differently colored dots are printed at each location based upon a comparison of the pixel's corresponding CMY color values to a threshold value, and the smoothing tendency of the human eye to perceive a mixture of differently colored dots and white spaces as a shade of color is relied upon. From these observations, it can be concluded that it is not critical for the CMY color values associated with each pixel to be precisely calculated. It is only necessary for the average of the CMY color values representing a cluster of image pixels to be approximately equal to the average of the true, precisely calculated CMY color values associated with the cluster of image pixels. Still, abrupt color transitions must be avoided.

The method of the present invention employs a process referred to as "stochastic interpolation" to assign the CMY color values associated with one of the eight surrounding corner RGB look-up table entries to a set of RGB color values associated with a pixel in an image. In the method, there is a tendency for the set of RGB color values of the image pixel to be assigned the CMY color values associated with the closest of the eight corner RGB look-up table entries, thus ensuring an accurate replication of the original image. However, an element of randomness is also introduced in order to create a mixture or interspersion of CMY color values among pixels having nearly identical sets of RGB color values, which pixels may be clustered or adjacent. Thus, abrupt color transitions in the converted CMY image are avoided. In addition, in the method of the present invention, the average of the CMY color values assigned to a cluster of image pixels is substantially equal to the average of the true CMY color value equivalents of the cluster of image pixels. Thus, an appropriate number of clustered dots of various colors are produced on the print medium, creating the perception of a correct shade of color. The same average color value is achieved with the method of the present invention as with trilinear interpolation, but the costly calculations associated with trilinear interpolation are avoided.

FIG. 2 shows an intervening point P having RGB coordinates (108, 50, 207) and being disposed within a unit cube defined by eight RGB color value combinations from a look-up table. As can be readily ascertained, each of the RGB color values from the look-up table entries is a multiple of eight in this particular embodiment. However, it is to be understood that the look-up table can contain different color values with different spacings therebetween.

As an example of how CMY color values are assigned to an RGB image pixel by the method of the present invention, the assignment of CMY color values to the image pixel having red, green and blue color values of 108, 50 and 207, respectively, is examined. Each of the three color values is stored in memory as an eight bit binary number. For example:

the red color value of 108 is stored as 0110 1100;

the green color value of 50 is stored as 0011 0010; and the blue color value of 207 is stored as 1100 1111.

In order to introduce an element of randomness, a random number is added to each of the red, green and blue color values of the image pixel. It is to be understood that the term "random number" as used herein includes the meaning of the term "quasi-random number", as may be derived by computer algorithm or other deterministic processes. In one embodiment, a random number is created by multiplying the right-most or least significant bit (LSB) of each of the three color values by a respective multiple, and adding the results together. As an example, the red LSB of 0 can be multiplied by 1 to equal 0, the green LSB of 0 can be multiplied by 2 to equal 0, the blue LSB of 1 can be multiplied by 4 to equal 4, and the results can be added together to arrive at 0000 0100. This intermediate random number is added to the red color value of 0110 1100 to arrive at an intermediate randomized red color value of 0111 0000. Similarly, the intermediate random number of 0000 0100 can be added to the green color value and the blue color value to arrive at an intermediate randomized green color value of 0011 0110 and an intermediate randomized blue color value of 1101 0011.

In order to obtain final randomized color values for each of red, green and blue, a predetermined number of least significant bits of each of the intermediate randomized red, green and blue color values are set to zero or "truncated"For example, the three least significant bits of each of the intermediate randomized color values can be set to zero in order to obtain:

a final randomized red color value of 0111 0000 or 1112;

a final randomized green color value of 0011 0000 or 48; and a final randomized blue color value of 1101 0000 or 208.

These final randomized color values can be compiled together to obtain a set of randomized RGB color values (112, 48, 208). This set of randomized RGB color values is shown in FIG. 2 as being equal to the RGB color values of one of the eight corners of the unit cube. Thus, (112, 48, 208) is one of the selected sets of RGB color values in the look-up table stored in memory. The look-up table also contains a set of CMY color values corresponding to this selected set of RGB color values. As indicated by the arrow in FIG. 2, this set of CMY color values is assigned to a location on the print medium which corresponds to the image pixel having the RGB color values (108, 50, 207).

By virtue of the three least significant bits of each intermediate randomized color value being set to zero in this embodiment, each final randomized color value is a multiple of eight. Since a look-up table is provided which includes an entry for each to set of RGB color values in which each color value is a multiple of eight, it is ensured that each set of randomized RGB color values will be included in the look-up table.

This has the advantage of eliminating any calculation otherwise necessary to determine which of the selected sets of RGB color values in the look-up table is closest to the set of randomized RGB color values.

It can be demonstrated that, in the above embodiment, setting the three least significant bits of the intermediate randomized color values equal to zero is equivalent to adding a zero mean random number to each of the RGB color values then rounding to the nearest multiple of eight. By multiplying the LSB of each color value by 1, 2 and 4, respectively, and summing the results, an intermediate random number ranging between 0 and 7 and having a mean of 3.5 is produced. This intermediate random number is added to each color value to obtain intermediate randomized color values. In contrast, setting the three least significant bits of each intermediate randomized color value to zero effectively adds another random number, ranging between 0 and −7 and having a mean of −3.5, to each intermediate random color value. The total effect of the above steps is to add a zero mean random number to the RGB color values to produce a set of randomized RGB color values which correspond to entries available in the sparsely populated color lookup table. By the random number having a mean of zero, the average value of a cluster of points will be accurately preserved. It can also be demonstrated that this zero mean random number is independent of the position of the pixel whose RGB color values are being converted to CMY color values. The process of determining the set of randomized RGB color values is completely deterministic, as it is possible to state a priori what the randomized RGB color values will be for any set of RGB color values. That is, nothing outside of the 24 bits of the RGB color values has any effect on the randomized RGB color values.

The above-described method of the present invention can be repeated for each pixel in the image that is to be converted to CMY color values. By using a threshold matrix, such as shown in FIG. 3, a masking process, as described above, may be applied to the resulting array of CMY color values.

Rather than a zero mean random number, it is also possible, with a slight modification of the above embodiment, to add a non-zero mean random number to the RGB color values. For example, rather than multiplying the LSB of the red, green and blue color values by 1, 2 and 4, respectively, they can be multiplied by 2, 2 and 4, respectively. The summation of these products is a random number ranging between 0 and 8 and having a mean of 4.0. In this case, setting the three LSB's of a randomized color value equal to zero, thereby effectively adding a random number having a mean of −3.5, does not result in a total effect of adding a zero mean random number.

In another embodiment, instead of adding a same intermediate random number to each of the red, green and blue color values, a different intermediate random number is added to each. For example, as discussed above, the LSB of the red, green and blue color values can be multiplied by 1, 2 and 4, respectively, to produce a first intermediate random number to be added to the red color value. Further, the LSB of the red, green and blue color values can alternatively be multiplied by 4, 1 and 2, respectively, to produce a second intermediate random number. This second intermediate random number can then be added to the green color value. Similarly, the LSB of the red, green and blue color values can alternatively be multiplied by 2, 4 and 1, respectively, to produce a third intermediate random number which is added to the blue color value.

In the above embodiments, the randomized RGB values obtained can range from 0 to 256. This has the disadvantage of being a grater range than can be represented by an 8-bit number. This disadvantage can be eliminated by scaling the original RGB values prior to adding the random values. The goal is to prevent the sum of the scaled RGB value plus the random value from exceeding 255. If the random number can have a maximum value of 7, the original values are scaled by (255-7)/255. This can be closely approximated with great efficiency by a scale factor of (256-8)/256 which can be implemented with 1 shift and 1 subtract. This has the advantage of reducing the number of table entries required in each dimension and making that number a power of two. For example, a table whose RGB values are all multiples of 8 would require 33 entries per dimension for a total of 35,937 entries. If the RGB values are scaled down by a factor of (256-8)/256, then only 32 entries per dimension are required for a total of 32,768.

It is also possible to provide a look-up table that is more sparse in order to reduce memory requirements. For example, a look-up table can be provided which includes an entry for each set of RGB color values in which each color value is a multiple of sixteen rather than eight. This results in a look-up table having approximately 4096 entries [(256/16)$^3$] rather than over 32,000 entries. After subtracting 1/16th its value and adding an appropriate random number, the four least significant bits of each intermediate randomized color value can be set to zero in order to produce a set of 8-bit randomized RGB color values that can be found in the look-up table.

In yet another embodiment, the three-dimensional lookup table is replaced by a one-dimensional equivalent. For example, red, green and blue color values can be scaled by (256-16)/256 and then added to each is a random value ranging from 0–15. When the rightmost four bits of each of the red, green and blue color values are set to zero, only four significant bits from each color value remain. These bits can be concatenated into a single 12-bit value and used to index into a one-dimensional lookup table containing 4,096 entries. Indexed color has the advantage of reducing the amount of data needed to represent an image. It is used in a great many image file formats, is often used on computer video displays and is available in commonly used printer page description languages.

The range of the random numbers should be no greater than a distance between adjacent selected sets of RGB color values in the look-up table. If the random number were to have a range greater than the distance between adjacent selected sets of RGB color values in the look-up table, it would be possible for a set of RGB color values to become associated with a set of RGB color values in the look-up table that is not one of the eight sets of RGB color values that define the surrounding unit cube. The random number may have any distribution characteristic, such as a uniform distribution or a bell-shaped distribution, for example.

In the example, three color components are shown as being included in the image pixel. However, the method of the present invention can be used with a pixel having a number of color components other than three. Moreover, the color components of the image pixel can be converted into CMYK as well as CMY.

The method of the present invention has been described herein as applying to the conversion of color values from one color space to another, such as from RGB to CMY. However, it is to be understood that the method of the present invention can also be applied to conversions within a single color space such as RGB to RGB. Moreover, the method of the present invention can also be applied to conversions of other sets of quantified image qualities such as, for example, hue, saturation and value (HSV) or hue, saturation and lightness (HSL). More generally, the method of the present invention can be applied to dithering based on noise in the least significant bits of input data into a reduced-precision color space of an output device. For example, the present invention may be used in mapping 72 dpi, 24 bit RGB into a non-colorimetric 5-bit-per-pixel high resolution (200 dpi) plasma display.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of converting a first set of RGB color values into a set of output color values, the first set of RGB color values including a first binary red color value, a first binary green color value and a first binary blue color value, said method comprising the steps of:

providing a look-up table associating a respective, predetermined set of output color values with each of a plurality of selected sets of RGB color values;

multiplying a least significant bit of the first binary red color value by a first integer to obtain a first product;

multiplying a least significant bit of the first binary green color value by a second integer to obtain a second product;

multiplying a least significant bit of the first binary blue color value by a third integer to obtain a third product;

adding together said first product, said second product and said third product to obtain an intermediate random number;

adding said intermediate random number to the first binary red color value to obtain an intermediate randomized red color value;

setting a predetermined number of least significant bits of said intermediate randomized red color value equal to a predetermined value to obtain a final randomized red color value;

repeating each of said step of adding said intermediate random number and said setting step for each of the first binary green color value and the first binary blue color value to obtain a final randomized green color value and a final randomized blue color value;

compiling together each of said final randomized red color value, said final randomized green color value, and said final randomized blue color value to obtain a set of randomized RGB color values;

determining a closest one of said selected sets of RGB color values in said look-up table which is closest to said set of randomized RGB color values; and converting the first set of RGB color values into a set of output color values that is associated with said closest one of said selected sets of RGB color values in said look-up table.

2. The method of claim 1, wherein said first integer comprises one of 2, 4 and 8, said second integer comprises another of 2, 4 and 8, and said third integer comprises yet another of 2, 4 and 8.

3. The method of claim 2, wherein said predetermined number of least significant bits is equal to four.

4. The method of claim 1, wherein said lookup table is one dimensional and said process of compiling together involves discarding bits previously set to zero and combining the remaining bits into a single color index.

5. The method of claim 1, wherein a different said first integer, a different said second integer, and a different said third integer is used in obtaining each of said intermediate randomized red color value, said intermediate randomized green color value, and said intermediate randomized blue color value.

6. The method of claim 1, wherein said selected sets of RGB color values in said look-up table comprise every set of RGB color values in which each of the red color value, the green color value and the blue color value is less than 256 and is a multiple of 16.

7. The method of claim 1, wherein said steps of adding said intermediate random number to the first binary red, to the first binary green, and to the first binary blue color values contain the substeps of reducing said first binary red, first binary green and first binary blue color values by a scale factor such that the resulting sums cannot exceed 255.

8. The method of claim 1, comprising the further step of halftoning.

9. The method of claim 8 wherein said halftoning method is error diffusion.

10. The method of claim 9, wherein said halftoning is performed using at least one threshold array.

11. The method of claim 1, wherein said predetermined value is zero.

12. A method of converting a first set of RGB color values into a set of CMY color values, the first set of RGB color values including a first binary red color value, a first binary green color value and a first binary blue color value, said method comprising the steps of:

provide a look-up table associating a respective, predetermined set of CMY color values with each of a plurality of selected sets of RGB color values;

adding an intermediate random number to the first binary red color value to obtain an intermediate randomized red color value, said intermediate random number being dependent upon at least one of the first binary red color value, the first binary green color value and the first binary blue color value;

setting a predetermined number of least significant bits of said intermediate randomized red color value equal to zero to obtain a final randomized red color value;

repeating each of said step of adding said intermediate random number and said setting step for each of the first binary green color value and the first binary blue color value to obtain a final randomized green color value and a final randomized blue color value;

compiling together each of said final randomized red color value, said final randomized green color value, and said final randomized blue color value to obtain a set of randomized RGB color values;

determining a closest one of said selected sets of RGB color values in said look-up table which is closest to said set of randomized RGB color values; and converting the first set of RGB color values into a set of CMY color values that is associated with said closest one of said selected sets of RGB color values in said look-up table.

13. A method of converting a first set of RGB color values into a set of CMY color values, the first set of RGB color values including a first red color value, a first green color value and a first blue color value, said method comprising the steps of:

providing a look-up table associating a respective, predetermined set of CMY color values with each of a plurality of selected sets of RGB color values;

adding a first random number to the first red color value to obtain a randomized red color value;

adding a second random number to the first green color value to obtain a randomized green color value;

adding a third random number to the first blue color value to obtain a randomized blue color value;

compiling together each of said randomized red color value, said randomized green color value, and said randomized blue color value to obtain a set of randomized RGB color values;

determining a closest one of said selected sets of RGB color values in said look-up table which is closest to said set of randomized RGB color values; and converting the first set of RGB color values into a set of CMY color values that is associated with said closest one of said selected sets of RGB color values in said look-up table.

14. The method of claim 13, wherein at least one of said first random number, said second random number and said third random number has a non-zero mean.

15. The method of claim 13, wherein at least one of said first random number, said second random number and said third random number is dependent upon at least one of the first red color value, the first green color value and the first blue color value.

16. A method of converting a first set of color values into a second set of color values, the first set of color values including at least a first color value and a second color value, said method comprising the steps of:

providing a look-up table associating a respective, predetermined second set of color values with each of a plurality of selected first sets of color values;

adding a first random number to the first color value to obtain a randomized first color value;

adding a second random number to the second color value to obtain a randomized second color value;

compiling together each of said randomized first color value and said randomized second color value to obtain a randomized first set of color values;

determining a closest one of said selected first sets of color values in said look-up table which is closest to said randomized first set of color values; and converting the first set of color values into a second set of color values that is associated with said closest one of said selected first sets of color values in said look-up table.

* * * * *